United States Patent
Iida

(10) Patent No.: US 6,895,312 B2
(45) Date of Patent: May 17, 2005

(54) DOOR UNLOCK CONTROL SYSTEM

(75) Inventor: Minoru Iida, Tokyo-To (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 81 days.

(21) Appl. No.: 10/659,314

(22) Filed: Sep. 11, 2003

(65) Prior Publication Data
US 2004/0059488 A1 Mar. 25, 2004

(30) Foreign Application Priority Data
Sep. 13, 2002 (JP) .......................... 2002-268398

(51) Int. Cl.$^7$ ............................................... G06F 7/00
(52) U.S. Cl. ........................... 701/1; 701/36; 701/45; 180/277
(58) Field of Search .......................... 701/1, 36, 45–49; 280/734, 735; 307/10.1, 10.2; 180/274, 277; 70/237; 292/341.16, 24, 25, 144

(56) References Cited

U.S. PATENT DOCUMENTS

| | | | | |
|---|---|---|---|---|
| 5,646,608 A | * | 7/1997 | Shintani | 340/825.52 |
| 5,894,906 A | * | 4/1999 | Weber | 180/274 |
| 6,081,758 A | * | 6/2000 | Parvulescu | 701/45 |
| 6,312,045 B2 | * | 11/2001 | Kitagawa | 296/187.12 |
| 6,628,233 B2 | * | 9/2003 | Knockeart et al. | 342/357.1 |

* cited by examiner

Primary Examiner—Richard M. Camby
(74) Attorney, Agent, or Firm—Smith, Gambrell & Russell

(57) ABSTRACT

A door unlock control system detects collision to a vehicle and executes door unlocking. The type of collision to the vehicle is determined. The order of execution of door unlocking is determined based on the type of collision. Door unlocking is then executed based on the order of execution.

8 Claims, 5 Drawing Sheets

DOOR UNLOCK CONTROL SYSTEM

BACKGROUND OF THE INVENTION

The present invention relates to a door unlock control system for unlocking vehicle doors in case of collision.

A known door unlock control system is equipped with a door lock controller that outputs an unlocking signal in response to an airbag operation signal from an airbag controller and a door lock actuator that releases a door lock mechanism from door locking in response to the unlocking signal, thus performing door unlocking in case of collision.

The known system could, however, not unlock every door of a vehicle, for example, if a power fuse of the door lock mechanism is blown due to short-circuit at the moment of door unlocking when a harness of the door lock actuator is made contact with the ground in case of collision.

A power fuse may be provided per pair of left/right doors or per door to avoid such a situation in that every door cannot be unlocked, which is, however, resulted in complex wiring and high cost.

SUMMARY OF THE INVENTION

A purpose of the present invention is to provide a highly-safe door unlock control system equipped with a single power fuse for unlocking any one of vehicle doors.

The present invention provides a door unlock control system for detecting collision to a vehicle and executing door unlocking comprising: a collision-type determiner to determine a type of collision to the vehicle; and a door lock controller to determine order of execution of door unlocking based on the type of collision and execute door unlocking based on the order of execution.

DETAILED DESCRIPTION OF THE EMBODIMENTS

Several embodiments according to the present invention will be disclosed with reference to the attached drawings.

(First Embodiment)

Figure 1:
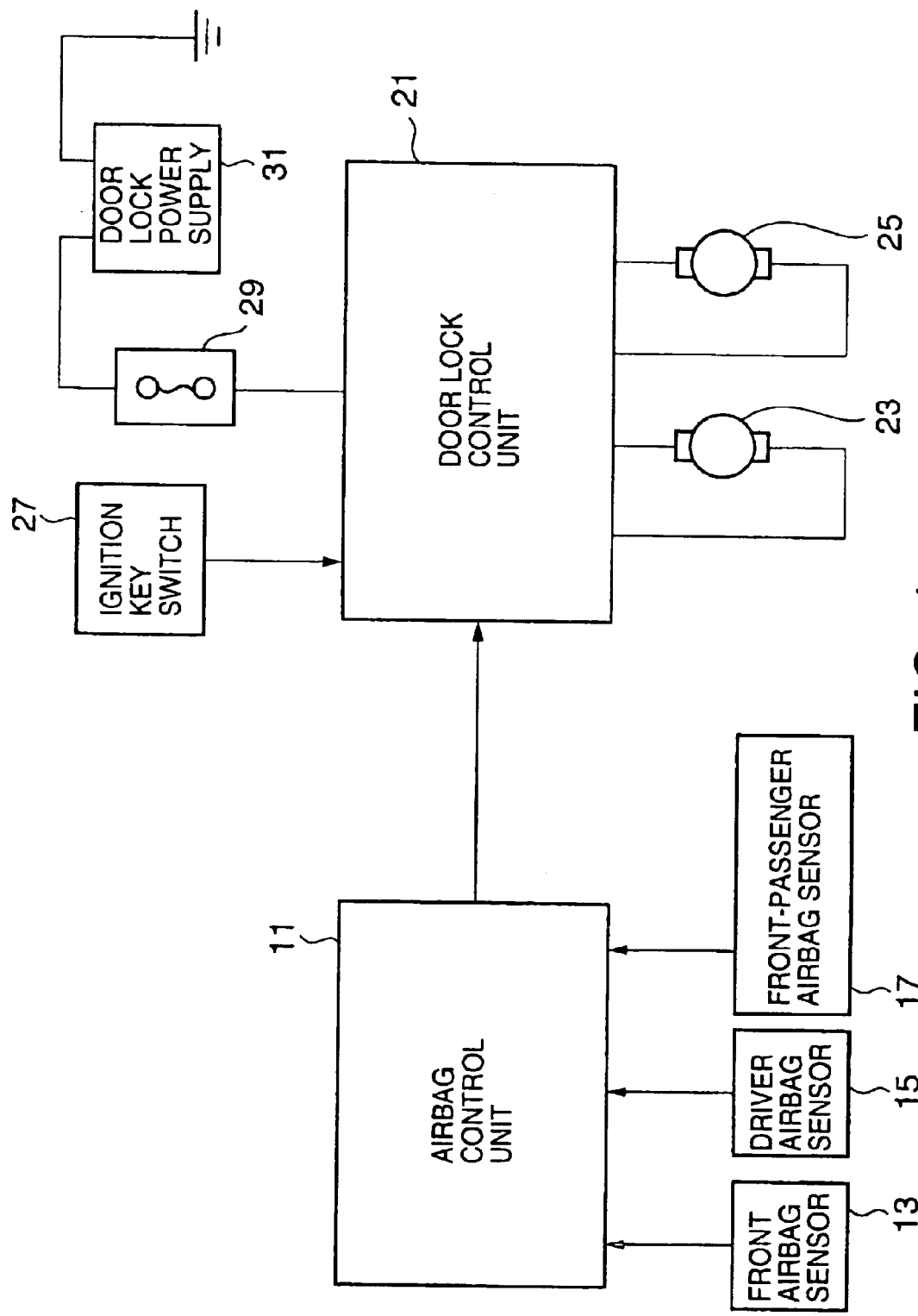
FIG. 1 shows a block diagram of a door unlock control system according to a first embodiment of the present invention.

FIG. 1 shows a block diagram of a door unlock control system according to a first embodiment of the present invention.

A door unlock control system shown in FIG. 1 is mainly equipped with an airbag control unit 11 and a door lock control unit 21.

The airbag control unit 11 receives output signals from a front airbag sensor 13, a driver airbag sensor 15 and a front-passenger airbag sensor 17. These sensors are electrical sensors for detecting the magnitude of impact applied to a vehicle in case of collision.

In response to the output signals, the airbag control unit 11 detects collision and activates any airbag, such as, a driver front airbag, a driver side airbag, a front-passenger airbag, and a front-passenger side airbag (all not shown).

The airbag control unit 11 includes a CPU for executing several types of processing under control programs, ROMs for prestoring the control programs, control data, etc., and RAMs for temporarily storing several types of data required for executing several types of processing.

Figure 2:
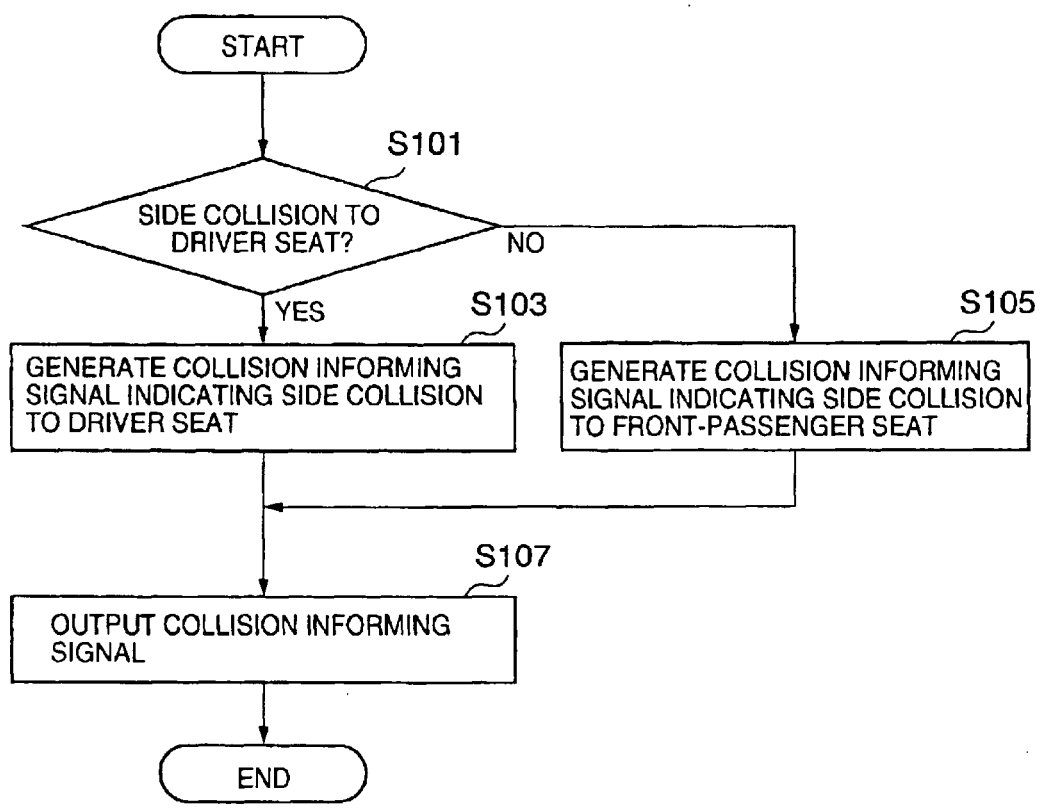
FIG. 2 shows a flow chart showing an exemplary operation of an airbag control unit in the door unlock control system according to the first embodiment of the present invention.

As shown in a flow chart in FIG. 2, the airbag control unit 11 determines the type of collision and outputs a signal corresponding to the type (direction) of collision. There are two types of collision in this embodiment. The first type (direction) is side collision to the driver seat. The second type (direction) is collision to the front passenger seat. The airbag control unit 11 acts as a collision-type determiner.

In FIG. 2, the airbag control unit 11 determines whether the collision is the side collision to the driver seat based on the output signals from the front airbag sensor 13, the driver airbag sensor 15 and the front passenger airbag sensor 17 (S101).

When it is determined that the collision is the side collision to the driver seat (YES in S101), the airbag control unit 11 generates a collision informing signal that indicates the side collision to the driver seat (S103).

In contrast, when it is determined that the collision is not the side collision to the driver seat (NO in S101), the airbag control unit 11 generates a collision informing signal that indicates the collision to the front passenger seat (S105).

The collision informing signal generated in step S103 or S105 is then supplied to the door lock control unit 21 (S107), and the process ends.

Referring to FIG. 1 again, connected separately to the door lock control unit 21 are a driver door lock actuator 23 and a front passenger door lock actuator 25. On receiving a locking signal from the door lock control unit 21, the actuators 23 and 25 operate their door locking mechanisms to lock the driver and passenger doors, respectively. On the contrary, on receiving an unlocking signal from the control unit 21, the actuators 23 and 25 operate their door locking mechanisms to unlock the driver and passenger doors, respectively. Also connected to the door lock control unit 21 is an ignition key switch 27.

Connected further to the door lock control unit 21 via a power fuse 29 is a door lock power supply 31. The driver door lock actuator 23 and the front passenger door lock actuator 25 are powered by the power supply 31 to start working. The power fuse 29 is used for both driver and front passenger doors.

The door lock control unit 21 includes a CPU for executing several types of processing under control programs, ROMs for prestoring the control programs, control data, etc., and RAMs for temporarily storing several types of data required for executing several types of processing.

Figure 3:
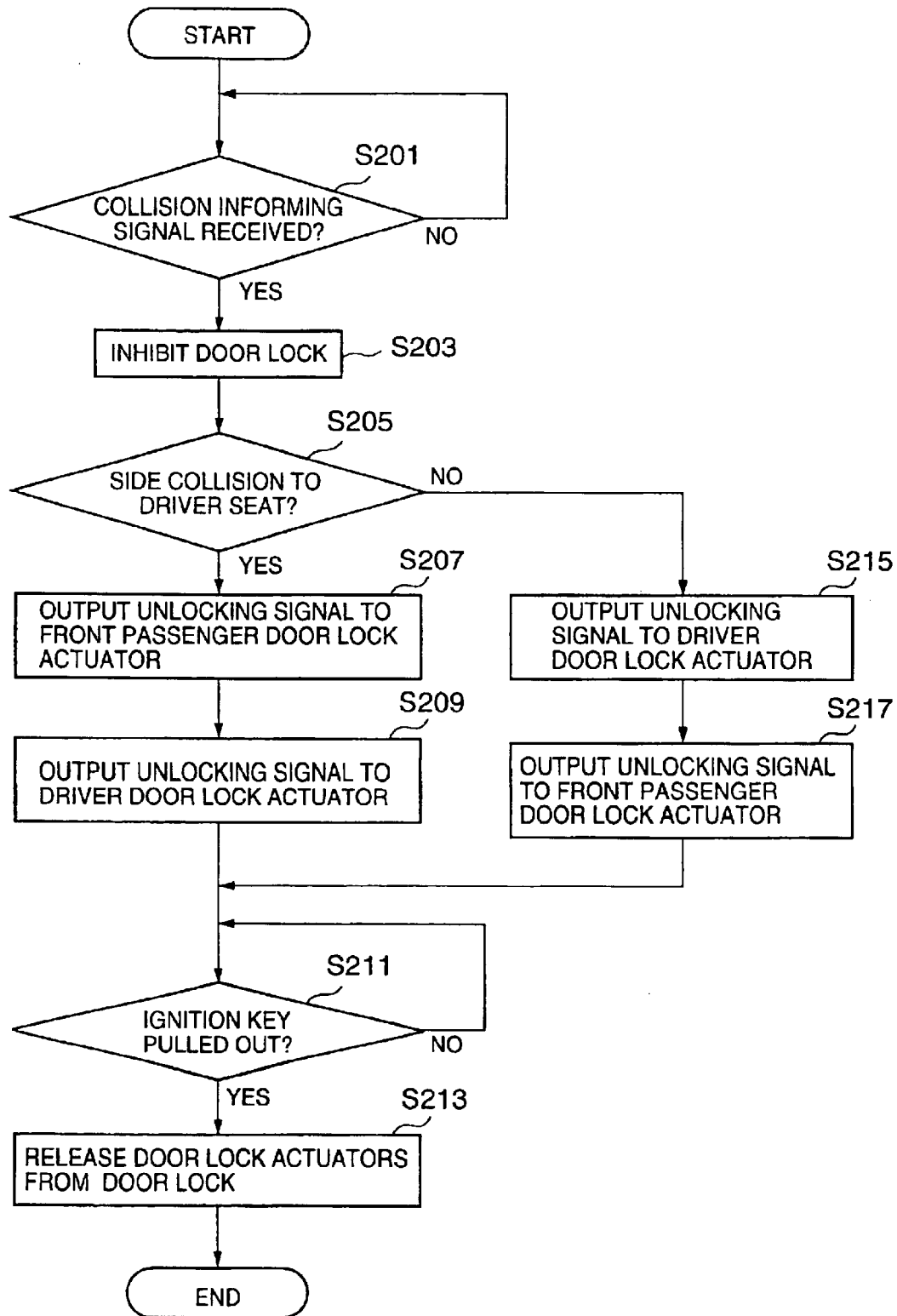
FIG. 3 shows a flow chart showing an exemplary operation of a door control unit in the door unlock control system according to the first embodiment of the present invention.

On receiving the collision informing signal from the airbag control unit 11, as shown in a flow chart in FIG. 3, the door lock control unit 21 decides the order of unlocking based on the informing signal and executes door unlocking in accordance with the order of unlocking. The order of unlocking in this embodiment is unlocking the driver door first and then the front passenger door or vice versa. The door lock control unit 21 acts as a door unlock controller.

In FIG. 3, the door lock control unit 21 determines whether the collision informing signal has been received (S201). The control unit 21 inhibits door locking (S203) when it is determined that the collision informing signal has been received (YES in S201). The door lock inhibition prevents a locking signal from being supplied to any door lock actuator even if the locking signal is supplied from a door lock switch (not shown).

Based on the collision informing signal, the door lock control unit 21 determines whether the collision is the side collision to the driver seat (S205).

The door lock control unit 21 outputs an unlocking signal to the front passenger door lock actuator 25 (S207) when it is determined that the collision is the side collision to the driver seat (YES in S205). The actuator 25 then operates its door locking mechanism to unlock the front passenger door.

Moreover, the door lock control unit 21 outputs an unlocking signal to the driver door lock actuator 23 (S209). The actuator 23 then operates its door locking mechanism to unlock the driver door.

In contrast, when it is determined that the collision is not the side collision to the driver seat, but it is the side collision to the front passenger seat (NO in S205), the door lock control unit 21 outputs an unlocking signal to the driver door lock actuator 23 (S215). The actuator 23 then operates its door locking mechanism to unlock the driver door.

Moreover, the door lock control unit 21 outputs an unlocking signal to the front passenger door lock actuator 25 (S217). The actuator 25 then operates its door locking mechanism to unlock the front passenger door.

Following to the step S209 or S217, the door lock control unit 21 determines whether an ignition key is pulled out based on a signal from the ignition key switch 27 (S211). When it is determined that the ignition key is pulled out (YES in S211), the control unit 21 releases the door lock actuators 23 and 25 from inhibition of door locking (S213) and the process ends.

As disclosed above, in the first embodiment, the door lock control unit 21 decides the order of unlocking based on the type of collision determined by the airbag control unit 11 and executes door unlocking in accordance with the order of unlocking.

This control mechanism allows either the driver door or the front passenger door to be unlocked even though both of the driver door actuator 23 and the front passenger door actuator 25 are powered via the single power fuse 29, thus enhancing safety.

In detail, in the first embodiment, the airbag control unit 11 determines the type (direction) of collision (the first type: side collision to the driver seat, the second type: side collision to the front passenger seat) and generates a collision informing signal.

Based on the collision informing signal, the door lock control unit 21 decides the order of unlocking and executes unlocking as follows:

Unlock first the front passenger door (not collided) and then the driver door, (collided from side); or Unlock first the driver door (not collided) and then the front passenger door (collided from side).

In other words, door unlocking is executed for the door which is not collided before the door which is collided. Therefore, in this embodiment, the door which is not collided is always unlocked before the single power fuse 29 is blown, for example, when the harness of a door lock actuator at the collided door is made contact with the ground.

Moreover, in this embodiment, the door lock control unit 21 inhibits door locking when collision is detected, however, halts inhibition of door locking when the ignition key is pulled out. This lock control mechanism always prevents unnecessary door locking.

(Second Embodiment)

Figure 4:
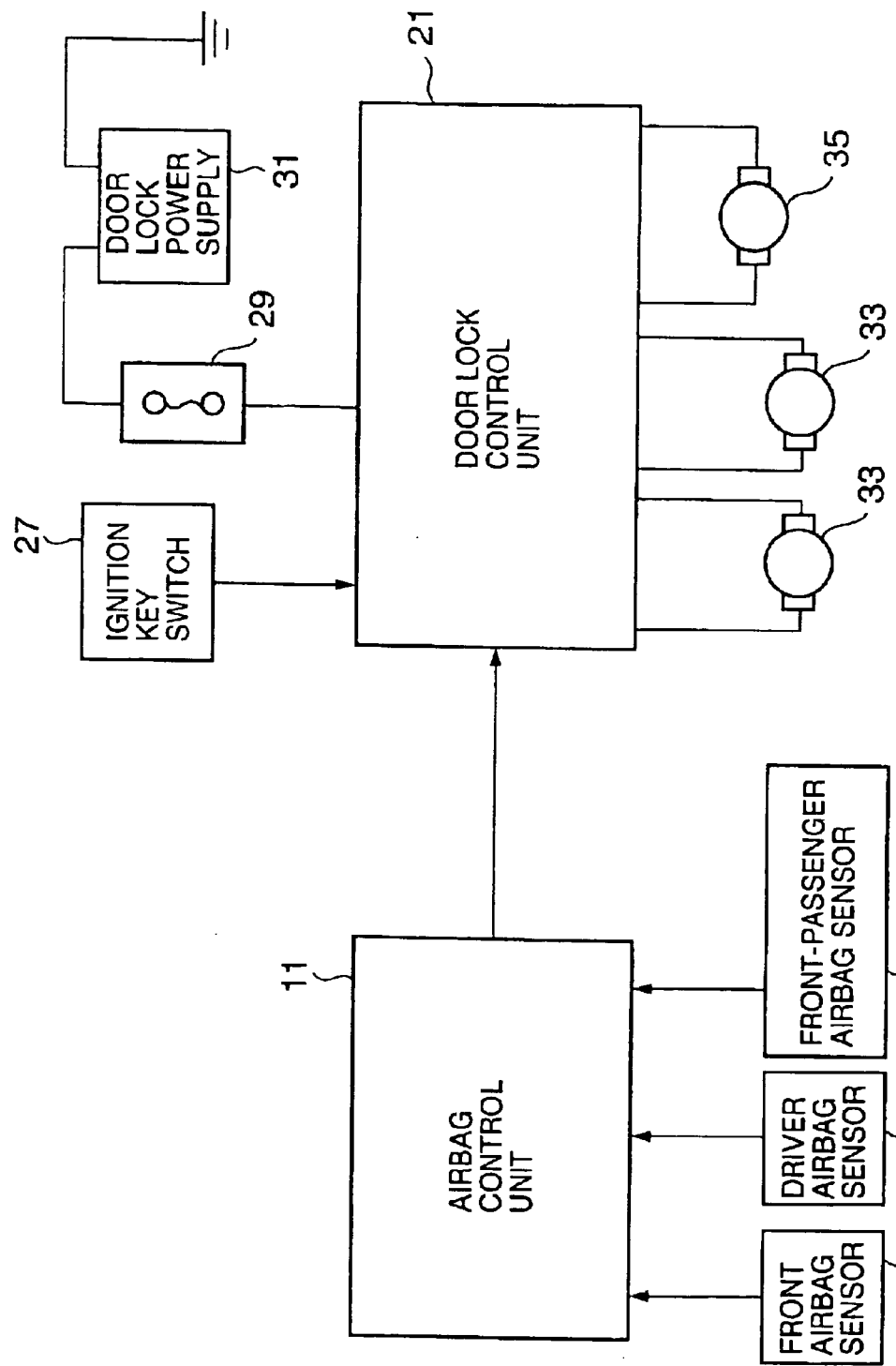
FIG. 4 shows a block diagram of a door unlock control system according to a second embodiment of the present invention.

FIG. 4 shows a block diagram of a door unlock control system according to a second embodiment of the present invention.

Elements in the second embodiment the same as or analogous to the elements in the first embodiment (FIG. 1) are given the same reference numerals and not explained in detail.

In FIG. 4, connected separately to a door lock control unit 21 are front and rear side-door lock actuators 33 and a rear gate door lock actuator 35. A power fuse 29 is used for both doors and a rear gate.

The airbag control unit 11 receives output signals from several airbag sensors 13, 15 and 17 and determines whether collision is front or rear collision, thus generating a collision informing signal indicating the front or the rear collision.

Figure 5:
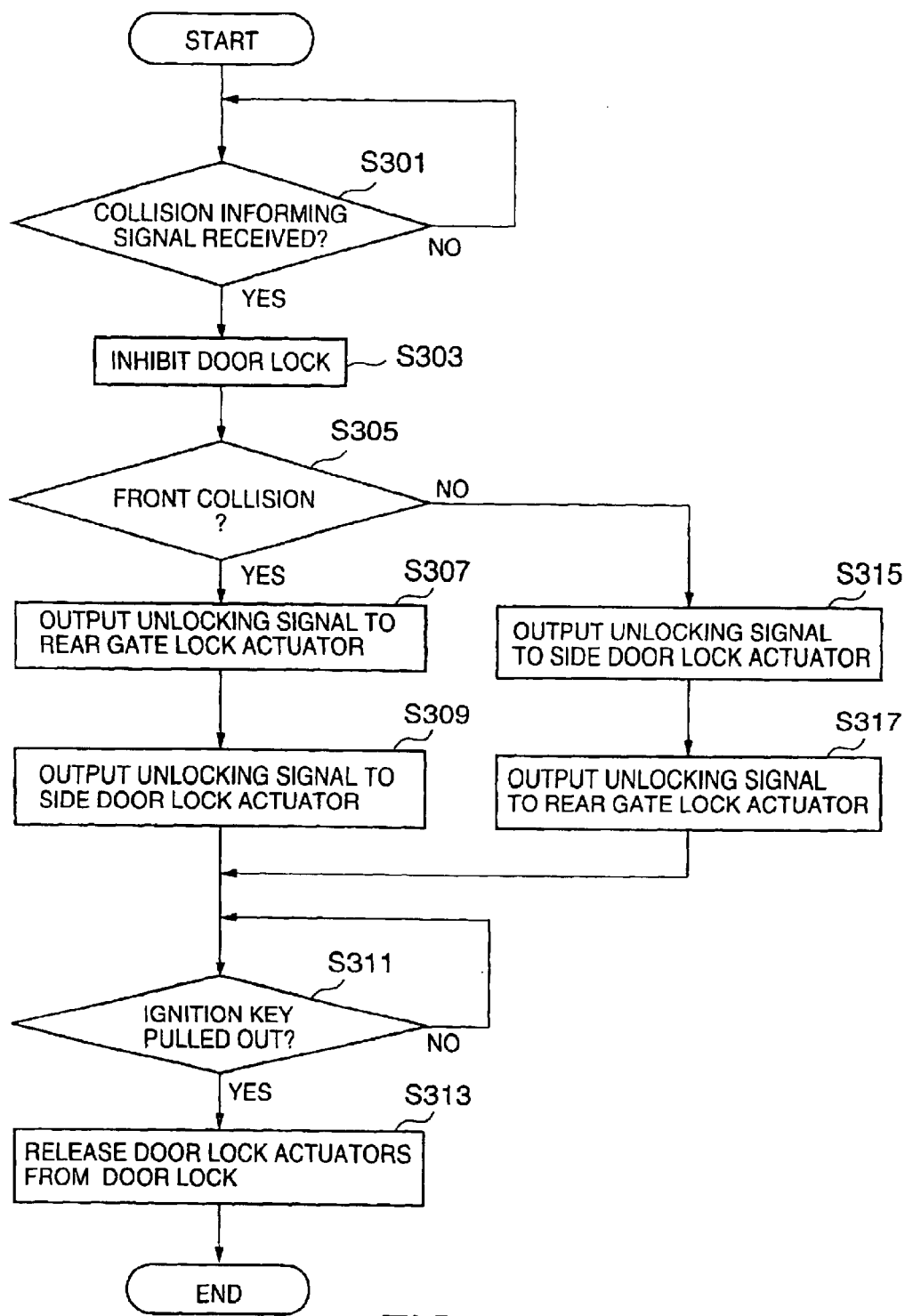
FIG. 5 shows a flow chart showing an exemplary operation of a door unlock control unit in the door unlock control system according to the second embodiment of the present invention.

The door lock control unit 21 decides the order of door unlocking based on the collision informing signal and executes door unlocking in accordance with the order of door unlocking, as shown in a flow chart in FIG. 5.

In FIG. 5, the door lock control unit 21 determines whether the collision informing signal has been received (S301). The control unit 21 inhibits door locking (S303) when it is determined that the collision informing signal has been received (YES in S301).

Based on the collision informing signal, the door lock control unit 21 determines whether the collision is the front collision (S305).

The door lock control unit 21 outputs an unlocking signal to the rear gate lock actuator 35 (S307) when it is determined that the collision is the front collision (YES in S305). The actuator 35 then operates its door locking mechanism to unlock the rear gate.

Moreover, the door lock control unit 21 outputs an unlocking signal to the side-door lock actuator 33 (S309). The actuator 33 then operates its door locking mechanism to unlock the side doors.

In contrast, when it is determined that the collision is not the front collision but the rear collision (NO in S305), the door lock control unit 21 outputs an unlocking signal to the side-door lock actuator 33 (S315). The actuator 35 then operates its door locking mechanism to unlock the side doors.

Moreover, the door lock control unit 21 outputs an unlocking signal to the rear gate door lock actuator 35 (S317). The actuator 35 then operates its door locking mechanism to unlock the rear gate.

Following to the step S309 or S317, the door lock control unit 21 determines whether an ignition key is pulled out based on a signal from an ignition key 27 (S311). When it is determined that the ignition key is pulled out (YES in S311), the control unit 21 releases the door-lock actuators 33 and 35 from inhibition of door locking (S313) and the process ends.

As disclosed, in the second embodiment, when the airbag control unit 11 determines that the collision is front collision, the door lock control unit 21 execute door unlocking first to the rear gate and then the side doors, based on the collision informing signal from the control unit 11.

In other words, door unlocking to the rear gate is executed before the side doors, thus the rear gate is always unlocked before the single power fuse 29 is blown, for example, when the harness of the side door-lock actuator 33 is made contact with the ground.

On the contrary, in the second embodiment, when the airbag control unit 11 determines that the collision is rear collision, the door lock control unit 21 executes door unlocking first to the side doors and then the rear gate, based on the collision informing signal from the control unit 11.

In other words, door unlocking to the side doors is executed before the rear gate, thus the side doors are always unlocked before the single power fuse 29 is blown, for example, when the harness of the rear gate door lock actuator 35 is made contact with the ground.

The present invention is not limited to the first and second embodiments disclosed above in detail.

For example, the type of collision is determined by the airbag control 11 in the first and second embodiments. Not only that, the type of collision may be determined, for example, by the door lock control unit 21 that receives output signals from collision sensors provided at several sections of a vehicle.

Moreover, in the second embodiment, when the airbag control unit 11 determines that the collision is front collision, the door lock control unit 21 may execute door unlocking first to the rear side doors instead of the rear gate and then the front side doors.

In addition, in the second embodiment, when the airbag control unit 11 determines that the collision is rear collision, the door lock control unit 21 may execute door unlocking first to the front side doors and then the rear side doors instead of the rear gate.

As disclosed, the present invention provides a highly-safe door unlock control system with one power fuse for unlocking any one of vehicle doors.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A door unlock control system for detecting collision to a vehicle and executes door unlocking comprising:

a collision-type determiner to determine a type of collision to the vehicle; and a door lock controller to determine order of execution of door unlocking based on the type of collision and execute door unlocking based on the order of execution.

2. The door unlock control system according to claim 1, when the collision-type determiner determines a direction of collision as the type of collision, the door lock controller executes door unlocking to a door of the vehicle which is not detected as being collided in the determined direction and then executes door unlocking to another door of the vehicle which is detected as being collided in the determined direction.

3. The door unlock control system according to claim 1, when the collision-type determiner determines side collision as the type of collision, the door lock controller executes door unlocking to a door of the vehicle which is not detected as being collided from side and then executes door unlocking to another door of the vehicle which is detected as being collided from side.

4. The door unlock control system according to claim 1, when the collision-type determiner determines front collision as the type of collision, the door lock controller executes door unlocking to rear doors of the vehicle and then executes door unlocking to front doors of the vehicle.

5. The door unlock control system according to claim 1, when the collision-type determiner determines front collision as the type of collision, the door lock controller executes door unlocking to a rear gate of the vehicle and then executes door unlocking to any door except the rear gate.

6. The door unlock control system according to claim 1, when the collision-type determiner determines rear collision as the type of collision, the door lock controller executes door unlocking to front doors of the vehicle and then executes door unlocking to rear doors of the vehicle.

7. The door unlock control system according to claim 1, when the collision-type determiner determines rear collision as the type of collision, the door lock controller executes door unlocking to any door except a rear gate of the vehicle and then executes door unlocking to the rear gate.

8. The door unlock control system according to claim 1, when collision of the vehicle is detected, the door lock controller inhibits door locking whereas allows door locking when an ignition key is pulled out.

* * * * *